US011079513B2

(12) United States Patent
Banzarov et al.

(10) Patent No.: US 11,079,513 B2
(45) Date of Patent: Aug. 3, 2021

(54) EVALUATION OF FORMATION COMPOSITION USING NEUTRON INDUCED GAMMA SPECTROSCOPY TOOLS

(71) Applicant: BAKER HUGHES, LLC, Houston, TX (US)

(72) Inventors: Bair Banzarov, Novosibirsk (RU); Alexander Vinokurov, Novosibirsk (RU); Toyli Anniyev, The Woodlands, TX (US); Maxim Vasilyev, The Woodlands, TX (US); Vladislav Krutko, Moscow (RU)

(73) Assignee: BAKER HUGHES, LLC, Houston, TX (US)

( * ) Notice: Subject to any disclaimer, the term of this patent is extended or adjusted under 35 U.S.C. 154(b) by 0 days.

(21) Appl. No.: 16/759,154

(22) PCT Filed: Nov. 8, 2017

(86) PCT No.: PCT/RU2017/000836

§ 371 (c)(1),
(2) Date: Apr. 24, 2020

(87) PCT Pub. No.: WO2019/093917

PCT Pub. Date: May 16, 2019

(65) Prior Publication Data

US 2020/0326452 A1 Oct. 15, 2020

(51) Int. Cl.
*G01V 5/10* (2006.01)

(52) U.S. Cl.
CPC .................................... *G01V 5/102* (2013.01)

(58) Field of Classification Search
CPC ........... G01V 5/101; G01V 5/102; G01V 5/10
See application file for complete search history.

(56) References Cited

U.S. PATENT DOCUMENTS 3,748,474 A 7/1973 Murphy
3,787,686 A 1/1974 Culver
(Continued)

FOREIGN PATENT DOCUMENTS

WO 2012026921 A1 3/2012

OTHER PUBLICATIONS

Clavier, et al.; "Quantitative Interpretation of Thermal Neutron Decay Time Logs: Part I. Fundamentals and Techniques"; J. Petroleum Technology; Jun. 1971; 13 pages.
(Continued)

*Primary Examiner* — David P Porta
*Assistant Examiner* — Fani Boosalis
(74) *Attorney, Agent, or Firm* — Cantor Colburn LLP

(57) ABSTRACT

Systems and methods for measuring formation properties in downhole operations are provided. The systems and methods include generating, at a neutron source, neutrons that are emitted into a downhole formation (302), registering, at a detector, photons generated by chemical constituents of the downhole formation (304), measuring a response of the photons registered at the detector (306), transforming, with a computing system, the measured responses of the photons registered at the detector into thermal neutron capture probabilities (308), and transforming the thermal neutron capture probabilities into weight concentrations of the chemical constituents of the downhole formation (312).

19 Claims, 5 Drawing Sheets

(56) References Cited

U.S. PATENT DOCUMENTS

| | | | |
|---|---|---|---|
| 3,925,659 A | 12/1975 | Paap et al. | |
| 3,928,762 A | 12/1975 | Peelman | |
| 4,002,903 A | 1/1977 | Pitts, Jr. et al. | |
| 4,055,763 A | 10/1977 | Antkiw | |
| 4,152,590 A | 5/1979 | Schultz et al. | |
| 4,327,290 A | 4/1982 | Plasek | |
| 4,445,033 A | 4/1984 | Preeg et al. | |
| 4,464,569 A | 8/1984 | Flaum | |
| 4,471,435 A | 9/1984 | Meisner | |
| 4,507,554 A | 3/1985 | Hertzog et al. | |
| 4,668,863 A | 5/1987 | Gray et al. | |
| 4,721,853 A | 1/1988 | Wraight | |
| 5,374,823 A | 12/1994 | Odom | |
| 5,900,627 A | 5/1999 | Odom et al. | |
| 5,973,321 A | 10/1999 | Schmidt | |
| 8,969,763 B2 | 3/2015 | Furman | |
| 8,972,194 B2 | 3/2015 | Barnes et al. | |
| 9,568,638 B2 | 2/2017 | Fitzgerald et al. | |
| 9,897,719 B2 * | 2/2018 | Stephenson | G01V 5/101 |
| 2010/0228483 A1 | 9/2010 | Lecompte | |
| 2012/0197529 A1 | 8/2012 | Stephenson et al. | |

OTHER PUBLICATIONS

Clavier, et al.; "Quantitative Interpretation of Thermal Neutron Decay Time Logs: Part II. Interpretation Example, Interpretation Accuracy, and Time-Lapse Technique"; J. Petroleum Technology; Jun. 1971; 8 pages.

International Search Report, International Application No. PCT/RU2017/0008365, dated Jul. 17, 2018, Korean Intellectual Property Office; International Search Report 4 pages.

International Written Opinion, International Application No. PCT/RU2017/000836, dated Jul. 17, 2018, European Patent Office; International Written Opinion 6 pages.

J. Galford et al., A Neutron-Induced Gamma-Ray Spectroscopy Tool for Geochemical Logging, 2009, SPWLA 50th Annual Logging Symposium, The Woodlands, USA. 14 pages.

Mimoun, et al.; "Quantitative Interpretation of Pulsed Neutron Capture Logs: Part 1—Fast Numerical Simulation"; Geophysics, vol. 76, No. 3; May-Jun. 2011; 13 pages.

Mimoun, et al.; "Quantitative Interpretation of Pulsed Neutron Capture Logs: Part 2—Inversion of Measurements in Thinly Bedded Formations"; Geophysics, vol. 76, No. 3; May-Jun. 2011; 9 pages.

Pemper, et al.; "A New Pulsed Neutron Sonde for Derivation of Formation Lithology and Mineralogy";SPE 102770; 2006; Society of Petroleum Engineers; 13 pages.

Plasek, et al.; "Improved Pulsed Neutron Capture Logging with Slim Carbon-Oxygen Tools: Methodology"; SPE 30598; Soc. Petroleum Engineers; Oct. 1995; 15 pages.

R. Hertzog et al., Geochemical Logging With Spectrometry Tools, 1989, SPE Formation Evaluation, pp. 153-162.

R. Radtke at al., A New Capture and Inelastic Spectroscopy Tool Takes Geochemical Logging to the Next Level, 2012, SPWLA 53rd Annual Logging Symposium, Cartagena, Colombia. 16 pages.

Springer, et al.; "Well Logging for Earth Scientists"; Pulsed Neutron Devices and Spectroscopy; vol. 15; 2007; pp. 383-414.

* cited by examiner

| | $WF_H$ | $WF_{Ca}$ | $WF_{Mg}$ | $WF_S$ | Density g/cc | Sigma 1/cm |
|---|---|---|---|---|---|---|
| Formation | 0.0086 | 0.3231 | 0.0923 | 0.3231 | 2.6 | 0.0186 |

| | H | Ca | Mg | S |
|---|---|---|---|---|
| $Y_j$ | 3619.183 | 15269.28 | 378.4682 | 17027.92 |
| $M_j$ | 1.008 | 40.08 | 24.305 | 32.066 |
| $\sigma_j*10^{24}$ | 0.3345 | 0.431 | 0.075 | 0.529 |
| $K_j$ | 38183.19 | 118124.1 | 55142.29 | 95547.38 |
| $B_j$ | 69.54 | 2869.44 | −3.3 | −25.89 |

FIG.6

| | H | Ca | Mg | S | Sum |
|---|---|---|---|---|---|
| $P_j$ | 0.244619 | 0.311797 | 0.017905 | 0.463628 | 1.037949 |
| Normalized $P_j$ | 0.235675 | 0.300397 | 0.017251 | 0.446677 | 1.000000 |

FIG.7

| | H | Ca | Mg | S |
|---|---|---|---|---|
| Evaluated Weight Fraction | 0.00844 | 0.331962 | 0.066432 | 0.321756 |
| Error % | 1.87 | 2.74 | 28.03 | 0.42 |

FIG.8

EVALUATION OF FORMATION COMPOSITION USING NEUTRON INDUCED GAMMA SPECTROSCOPY TOOLS

CROSS REFERENCE TO RELATED APPLICATIONS

This is a U.S. National Stage of Application No. PCT/RU2017/000836, filed Nov. 8, 2017, which is incorporated herein by reference in its entirety.

BACKGROUND

1. Field of the Invention

The present invention generally relates to downhole operations and systems for evaluating and analyzing downhole formations and elemental compositions thereof.

2. Description of the Related Art

Boreholes are drilled deep into the earth for many applications such as carbon dioxide sequestration, geothermal production, and hydrocarbon exploration and production. In all of the applications, the boreholes are drilled such that they pass through or allow access to a material (e.g., a gas or fluid) contained in a formation (e.g., a compartment) located below the earth's surface. Different types of tools and instruments may be disposed in the boreholes to perform various tasks and measurements. Obtaining information for making decisions for drilling operations, production operations, etc. is important to effectively perform such operation.

For example, determining chemical and/or elemental composition of downhole formations can be used for making decisions regarding drilling and/or production operations. Accordingly, having accurate processes and/or systems for detecting chemical compositions of formations is advantageous.

SUMMARY

Disclosed herein are systems and methods for measuring formation properties in downhole operations are provided. The systems and methods include generating, at a neutron source, neutrons that are emitted into a downhole formation, registering, at a detector, photons generated by chemical constituents of the downhole formation, measuring a response of the photons registered at the detector, transforming, with a computing system, the measured responses of the photons registered at the detector into thermal neutron capture probabilities, and transforming the thermal neutron capture probabilities into weight concentrations of the chemical constituents of the downhole formation.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 6 is a table of various parameters employed for the evaluation of the element weight concentrations of the illustrative example;

FIG. 7 is a table of capture probabilities obtained in the illustrative example; and FIG. 8 is a table of weight concentrations as obtained in the illustrative example.

DETAILED DESCRIPTION

Figure 1:
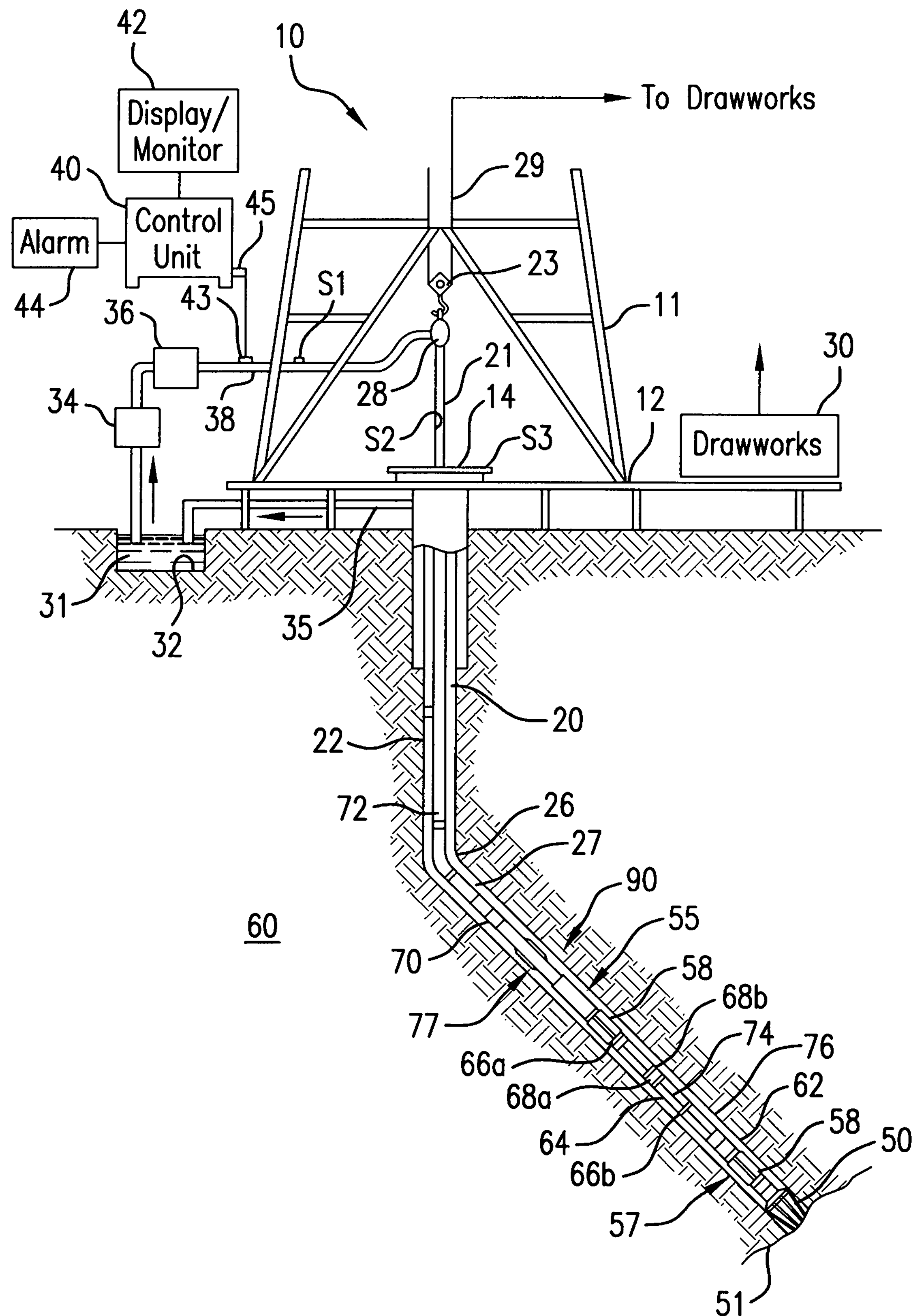
FIG. 1 is an example of a system for performing downhole operations that can employ embodiments of the present disclosure.

FIG. 1 shows a schematic diagram of a system for performing downhole operations. As shown, the system is a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegrating tool 50, such as a drill bit attached to the end of the BHA 90, disintegrates the geological formations when it is rotated to drill the borehole 26. The drill string 20 is coupled to surface equipment such as systems for lifting, rotating, and/or pushing, including, but not limited to, a drawworks 30 via a kelly joint 21, swivel 28 and line 29 through a pulley 23. In some embodiments, the surface equipment may include a top drive (not shown). During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegrating tool 50. The drilling fluid 31 circulates uphole through the annular space 27 between the drill string 20 and the borehole 26 and returns to the mud pit 32 via a return line 35. A sensor S1 in the fluid line 38 provides information about the fluid flow rate. A surface torque sensor S2 and a sensor S3 associated with the drill string 20 respectively provide information about the torque and the rotational speed of the drill string. Additionally, one or more sensors (not shown) associated with line 29 are used to provide the hook load of the drill string 20 and about other desired parameters relating to the drilling of the borehole 26. The system may further include one or more downhole sensors 70 located on the drill string 20 and/or the BHA 90.

In some applications the disintegrating tool 50 is rotated by only rotating the drill pipe 22. However, in other applications, a drilling motor 55 (mud motor) disposed in the drilling assembly 90 is used to rotate the disintegrating tool

50 and/or to superimpose or supplement the rotation of the drill string 20. In either case, the rate of penetration (ROP) of the disintegrating tool 50 into the borehole 26 for a given formation and a drilling assembly largely depends upon the weight on bit and the drill bit rotational speed. In one aspect of the embodiment of FIG. 1, the mud motor 55 is coupled to the disintegrating tool 50 via a drive shaft (not shown) disposed in a bearing assembly 57. The mud motor 55 rotates the disintegrating tool 50 when the drilling fluid 31 passes through the mud motor 55 under pressure. The bearing assembly 57 supports the radial and axial forces of the disintegrating tool 50, the downthrust of the drilling motor and the reactive upward loading from the applied weight on bit. Stabilizers 58 coupled to the bearing assembly 57 and other suitable locations act as centralizers for the lowermost portion of the mud motor assembly and other such suitable locations.

A surface control unit 40 receives signals from the downhole sensors 70 and devices via a transducer 43, such as a pressure transducer, placed in the fluid line 38 as well as from sensors S1, S2, S3, hook load sensors, RPM sensors, torque sensors, and any other sensors used in the system and processes such signals according to programmed instructions provided to the surface control unit 40. The surface control unit 40 displays desired drilling parameters and other information on a display/monitor 42 for use by an operator at the rig site to control the drilling operations. The surface control unit 40 contains a computer, memory for storing data, computer programs, models and algorithms accessible to a processor in the computer, a recorder, such as tape unit, memory unit, etc. for recording data and other peripherals. The surface control unit 40 also may include simulation models for use by the computer to processes data according to programmed instructions. The control unit responds to user commands entered through a suitable device, such as a keyboard. The control unit 40 is adapted to activate alarms 44 when certain unsafe or undesirable operating conditions occur.

The drilling assembly 90 also contains other sensors and devices or tools for providing a variety of measurements relating to the formation surrounding the borehole and for drilling the borehole 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly 62, for estimating or determining the resistivity of the formation near or in front of the disintegrating tool 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the mud motor 55 transfers power to the disintegrating tool 50 via a hollow shaft that also enables the drilling fluid to pass from the mud motor 55 to the disintegrating tool 50. In an alternative embodiment of the drill string 20, the mud motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, temperature measurement tools, pressure measurement tools, borehole diameter measuring tools (e.g., a caliper), acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 including a transmitter and transmits such received signals and data to the appropriate downhole devices. In one aspect, a mud pulse telemetry system may be used to communicate data between the downhole sensors 70 and devices and the surface equipment during drilling operations. A transducer 43 placed in the fluid line 38 (e.g., mud supply line) detects the mud pulses responsive to the data transmitted by the downhole telemetry 72. Transducer 43 generates electrical signals in response to the mud pressure variations and transmits such signals via a conductor 45 to the surface control unit 40. In other aspects, any other suitable telemetry system may be used for two-way data communication (e.g., downlink and uplink) between the surface and the BHA 90, including but not limited to, an acoustic telemetry system, an electro-magnetic telemetry system, an optical telemetry system, a wired pipe telemetry system which may utilize wireless couplers or repeaters in the drill string or the borehole. The wired pipe may be made up by joining drill pipe sections, wherein each pipe section includes a data communication link that runs along the pipe. The data connection between the pipe sections may be made by any suitable method, including but not limited to, hard electrical or optical connections, induction, capacitive, resonant coupling, or directional coupling methods. In case a coiled-tubing is used as the drill pipe 22, the data communication link may be run along a side of the coiled-tubing.

The drilling system described thus far relates to those drilling systems that utilize a drill pipe to conveying the drilling assembly 90 into the borehole 26, wherein the weight on bit is controlled from the surface, typically by controlling the operation of the drawworks. However, a large number of the current drilling systems, especially for drilling highly deviated and horizontal boreholes, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the borehole by a suitable injector while the downhole motor, such as mud motor 55, rotates the disintegrating tool 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66*a* or 66*b* and/or receivers 68*a* or 68*b*. Resistivity can be one formation property that is of interest in making drilling decisions. Those of skill in the art will appreciate that other formation property tools can be employed with or in place of the resistivity tool 64.

Liner drilling can be one configuration or operation used for providing a disintegrating device becomes more and more attractive in the oil and gas industry as it has several advantages compared to conventional drilling. One example of such configuration is shown and described in commonly owned U.S. Pat. No. 9,004,195, entitled "Apparatus and Method for Drilling a Borehole, Setting a Liner and Cementing the Borehole During a Single Trip," which is incorporated herein by reference in its entirety. Importantly, despite a relatively low rate of penetration, the time of getting the liner to target is reduced because the liner is run in-hole while drilling the borehole simultaneously. This may be beneficial in swelling formations where a contraction of the drilled well can hinder an installation of the liner later on. Furthermore, drilling with liner in depleted and unstable reservoirs minimizes the risk that the pipe or drill string will get stuck due to hole collapse.

Although FIG. 1 is shown and described with respect to a drilling operation, those of skill in the art will appreciate that similar configurations, albeit with different components, can be used for performing different downhole operations. For example, wireline, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired downhole operation(s), including, but not limited to, performance of a task or operation downhole and subsequent retrieval and/or transmission to the surface for processing of data or information associated with the downhole task/operation.

Embodiments of the present disclosure are directed to evaluation of weight concentration of formation elements using pulsed neutron capture spectra and thermal neutron decay time logs. In accordance with some embodiments, the pulsed neutron capture spectra are decomposed in to a linear composition of standard spectra. The coefficients of the decomposition (e.g., yields) are mapped into probabilities of absorption of thermal neutrons. Subsequently, the probabilities of absorption of thermal neutrons are transformed into weight concentrations. To obtain a unique set of the weight concentrations, an additional measurement and/or equation is employed. Accordingly, in some embodiments, thermal neutron decay time measurements are employed for obtaining unique sets of weight concentrations. The thermal neutron decay time measurements provide a cross section of thermal neutron absorption. The cross section of thermal neutron absorption are introduced into equations for deriving the weight concentrations and unique solutions are obtained.

To perform the measurements and analysis as described herein, a bottomhole assembly or other downhole tool includes one or more neutron sources and one or more associated detectors to enable measurement to be performed at the downhole tool (e.g., registration of photons and processing thereof). In some embodiments, the detectors can be gamma ray detectors. For example, the neutron source can emit high energy neutrons which are absorbed by elements of a formation, with the elements emitting gamma rays in response, with the gamma rays being detectable by a detector or other sensor. The downhole tool can be part of a drilling system (e.g., as shown in FIG. 1), may be part of a wireline system (as will be appreciated by those of skill in the art), or may be part of other downhole systems. In some embodiments, the neutron source and the sensor/detector can be a single tool or component and in other embodiments the two parts can be separate elements of the downhole tool or system. The neutron source can be any source as known in the art, including, but not limited to, a deuterium-based source, a chemical-based source. The neutron source can be a pulsed neutron source, but is not limited thereto.

Neutron capture spectra are used for evaluation of concentrations of formation elements that generate "capture photons," as readily appreciated by those of skill in the art. A formation is composed of a mix of chemical elements, which can be identified by weight concentrations $W_i$ [g/g]. In operation, neutrons are emitted by a neutron tool source which are subsequently absorbed by the atoms of the various elements of the formation. Different elements generate different photon energy spectra, which is released by the elements due to the interaction with the emitted neutrons. Further, certain elements (e.g., carbon, oxygen, etc.) may not generate enough photon energy such that the contribution of these elements in a detected signal is negligible. As such, a detected signal can be used to evaluate weight concentrations of elements that absorb neutrons and emit photons in response to such absorption, and thus contribution to a detected signal or measurement of photons in response to a neutron emission.

A typical evaluation or measurement scheme begins with an evaluation of contributions of each element into a detected signal or "measured spectra." The measured spectra are decomposed into a linear combination of standard spectra. The coefficients of the combination are the contributions (yields) from each of the respective elements that interacted with the emitted neutrons. Further, the yields can subsequently be transformed into weight concentrations of the respective elements.

Embodiments provided herein are directed to a process (e.g., an algorithm) of the evaluation of weight concentrations from measured responses of photons registered at a detector. In accordance with some embodiments, the weight concentrations are represented as linear functions of corresponding yields (see, e.g., Hertzog, R., et al., Geochemical Logging with Spectrometry Tools, 1989, SPE Formation Evaluation). In some embodiments, additional measurements are obtained downhole that allow more accurate evaluation of elemental weight concentrations.

In accordance with Hertzog's paper, each weight fraction $W_j$ is represented as a linear function of the yield $Y_j$:

$$W_j = F\frac{Y_j}{S_j},\ j = 1, N \tag{1}$$

To calculate the weight fraction for the j-th element, the coefficients F and $S_j$ must be established. The coefficient F is a formation factor that is determined for each log depth. The coefficient $S_j$ represents tool sensitivity factors that are given for each element and do not depend on the log depth.

The formation factor F takes into account formation properties and source strength. In some embodiments, the formation factor F derived using the oxide closure model (see, e.g., Hertzog, R., et al., Geochemical Logging with Spectrometry Tools, 1989, SPE Formation Evaluation; Radtke, R. J., et al., A New Capture and Inelastic Spectroscopy Tool Takes Geochemical Logging to The Next Level, SPWLA 53rd Annual Logging Symposium, 2012; Galford, J., New Neutron-Iinduced Gamma-Ray Spectroscopy Tool for Geochemical Logging, SPWLA 50th Annual Logging Symposium, 2009). The oxide closure model is based on the fact that the sum of the weight fractions is not equal to unity:

$$\Sigma_{i=1}^{N} W_i = \alpha;\ \alpha < 1 \tag{2}$$

The lack of unity in the oxide closure model occurs because at least two elements (e.g., carbon, oxygen) that are present in formations do not contribute to pulsed neutron capture spectra (i.e., carbon and oxygen are non-responsive to neutron pulses). The sum of the evaluated weight fractions is a varying value and, thus, it is necessary to have additional information to achieve an accurate evaluation. Typically, it is assumed that carbon and oxygen atoms are connected with the rest of formation elements through known oxides and carbonates. For example, it can be reasonably assumed that all silicon atoms of a formation are tied with oxygen atoms in the form of silicon dioxide. From this, the weight fraction of silicon can be evaluated if the weight fraction of silicon dioxide is known. Similar elemental connections (e.g., other reactive elements with non-reactive elements) and subsequent transformations are employed for other formation elements. It can then be assumed that the sum of weight fractions of given oxides is equal to unity. The ratio between oxide weight and element weight is given by coefficients $O_i$. From this, the formation factor F can be derived as:

$$F\left(O_1\frac{Y_1}{S_1}+O_2\frac{Y_2}{S_2}+\ldots+O_N\frac{Y_N}{S_N}\right)=1 \tag{3}$$

However, it is important to note that the representation of formation as a set of oxides is not unique. Therefore, the value of the formation factor F is not unique too. The uncertainty associated with the variability of the formation factor F can impact the accuracy of a determination of weight concentrations of a given formation.

Accordingly, embodiments of the present disclosure, are directed to, in part, improving the determination of formation weight concentrations. Such improvements can be achieved through obtaining a measurement of the cross-section of thermal neutron absorption. Advantageously, embodiments provided herein do not employ the formation factor F, described above and employed in Equation (1), and thus the uncertainty (or multiple fits) issue associated therewith does not arise.

Embodiments of the present disclosure include evaluating the weight concentrations from elemental yields in two steps. First, for each j-th element, the probability of neutron absorption $P_j$ is evaluated. It is assumed that the probabilities are linear functions of elemental yields:

$$P_j=\frac{\rho Y_j-B_j}{K_J},\ j=1,N \tag{4}$$

Figure 2:
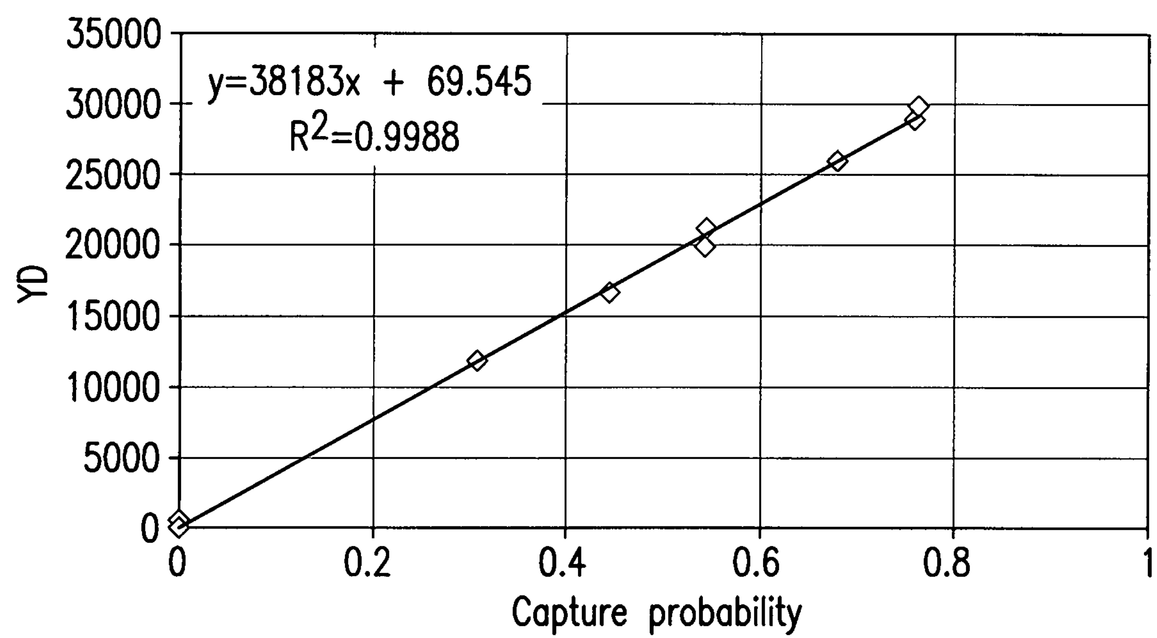
FIG. 2 is a plot illustrating a dependence between hydrogen yield (vertical axis) and hydrogen thermal neutron capture probabilities (horizontal axis)

In Equation (4), $Y_j$ is the yield of the j-th element, ρ is formation density, and $K_j$ and $B_j$ are tool sensitivity factors that are determined for each standard spectrum. For example, referring to FIG. 2, the dependence between hydrogen yields multiplied with density ($\rho Y_H$, vertical axis) and hydrogen capture probabilities ($P_H$, horizontal axis) are shown. Such dependencies are linear with parameters $K_j$ and $B_j$. Elemental dependencies are similarly built for each possible element in a formation composition, with the dependencies established using lab measurement and/or simulations.

Typically, in real-world conditions, the number of neutrons emitted by a neutron source is not a constant value. Further, many neutrons may be absorbed at high energies. This leads to decreasing a number of thermal neutrons, which in turn can lead to underestimation of the yields and probabilities. If this happens, the sum of the evaluated probabilities will be less than unity. To restore the correct values of the probabilities, the probabilities must be renormalized such that a sum of the probabilities is equal to unity.

Accordingly, in the first step of an embodiment of the present disclosure (after acquiring detected signals or "measured spectra"), the measured responses are transformed into thermal neutron capture probabilities. The probabilities can then be renormalized in order have a sum equal to unity.

After the optional normalization, the second step of the present embodiment is performed. During the second step, the normalized thermal neutron capture probabilities are transformed into weight concentrations. At this step, a formal representation of the thermal neutron capture probabilities as functions of cross-section are employed:

$$P_j\equiv\frac{\Sigma_j}{\Sigma},\ j=1,N,\text{ where} \tag{5}$$

$$\Sigma_j\equiv N_A\rho\frac{\sigma_j}{M_j}W_j \tag{6}$$

Here, $N_A$ is the Avogadro constant ($6.022=10^{23}$ $mol^{-1}$), $M_j$ is a molar mass of the j-th element, and $\sigma_j$) is a microscopic cross section of thermal neutron absorption. Σ is a formation macroscopic cross section of thermal neutron absorption. The macroscopic cross section of thermal neutron absorption Σ is obtained from neutron decay time measurements. Therefore the expression for the weight concentration $W_j$ has the following form:

$$W_j=\frac{\Sigma\cdot P_j\cdot M_j}{N_A\cdot\rho\cdot\sigma_j},\ j=1,N \tag{7}$$

Advantageously, embodiments of the present disclosure, do not employ the formation factor F, described above. Such embodiments can enable a decreasing of the uncertainties in evaluated values and decrease a number of involved corrections.

Figure 3:
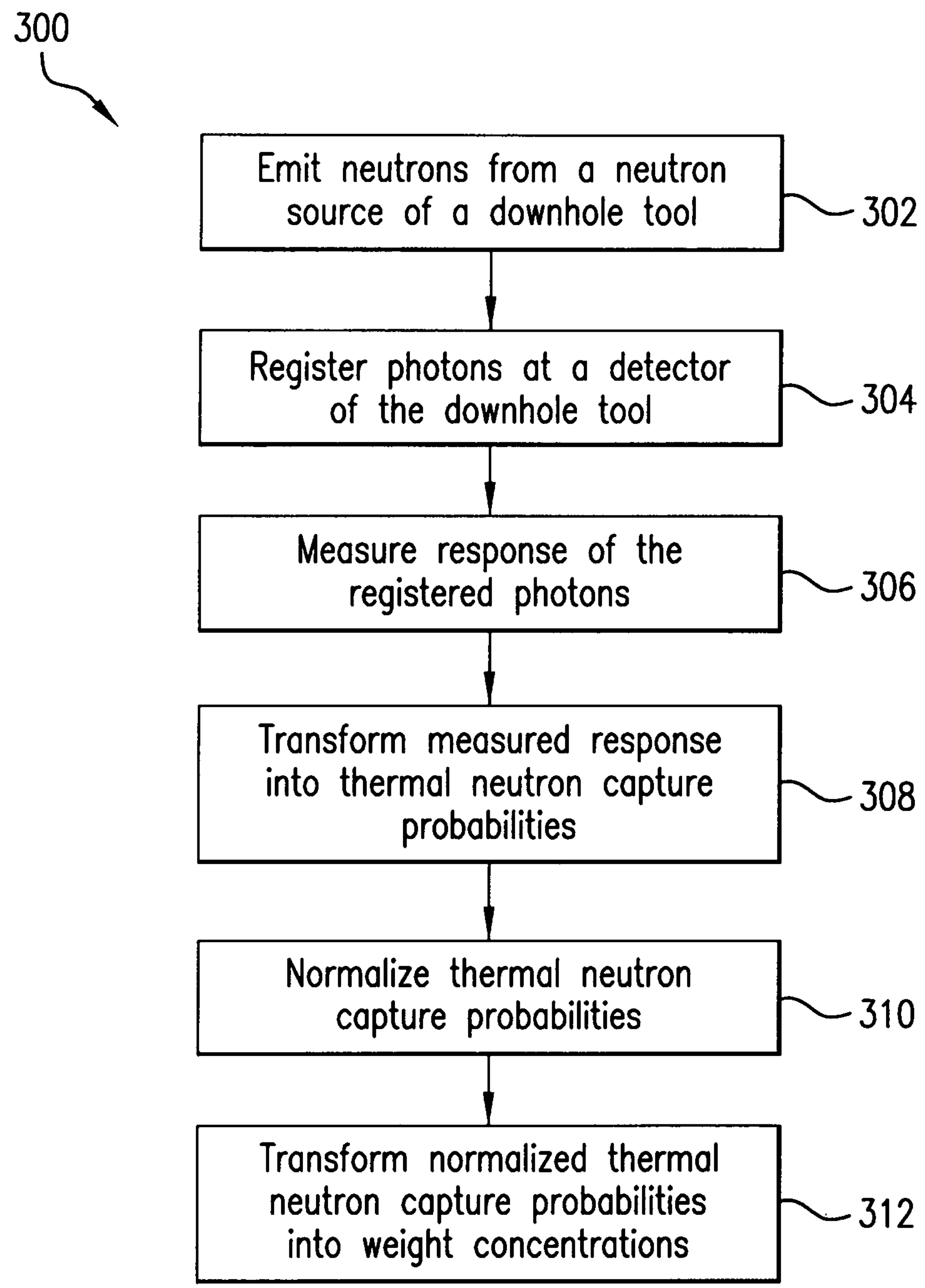
FIG. 3 is a flow process in accordance with an embodiment of the present disclosure.

Turning now to FIG. 3, a flow process 300 in accordance with an embodiment of the present disclosure is shown. The flow process 300 can be performed downhole during a drilling operation, or other downhole exploration and/or production operation. Further, the flow process 300 can be performed entirely downhole (e.g., using electronics of a downhole tool) or may be performed partially downhole and partially at the surface (e.g., using surface components and communication between the downhole tool and the surface). The flow process 300 can include computations and/or processing performed by a computing system that can include downhole and/or surface computing elements. In some embodiments, all of the computing system is located in the downhole tool (e.g., a bottomhole assembly) and in other embodiments, some elements of the computing system are located downhole and other elements are located at the surface. The downhole tool employed to carry out flow process 300 (or portions thereof) includes, at least, a neutron source arranged to perform pulsed neutron operations, and a detector associated with the neutron source, such as a gamma ray detector.

At block 302, neutrons are emitted by neutron source of the downhole tool, with the neutrons penetrating into a formation.

At block 304, the detector of the downhole tool will register photons that are generated by the chemical constituents of the formation. The registered photons (and data associated therewith) can be actively processed, can be stored for later processing, and/or can be transmitted (in real time or transmitted later) to a different downhole component and/or the surface.

At block 306, a response or responses of the photons registered at block 304 are measured. In some embodiments, the measuring of block 306 can include measuring capture phone energy spectra and can further include measuring a thermal neutron decay time.

At block 308, the measured response from block 306 is converted or transformed into thermal neutron capture probabilities.

At block 310, if required, the thermal neutron capture probabilities are normalized.

At block 312, the thermal neutron capture probabilities (or normalized thermal neutron capture probabilities) are converted or transformed into weight concentrations. The weight concentrations will provide an accurate and clear representation of the composition of the formation.

A non-limiting example of evaluating the weight fractions of formation elements in accordance with an embodiment of the present disclosure will now be discussed. For simplicity, thermal neutrons are distributed uniformly into the formation to be investigated and the borehole is dry. A composition of the formation is given with element weight fractions. In this example, a formation consisting of a mix of anhydrite, dolomite, and water is investigated. Due to the non-reactivity of certain elements (e.g., carbon and oxygen), among all elements comprising the composition of the formation, only four of the element provide capture photons.

Figures 4, 5:
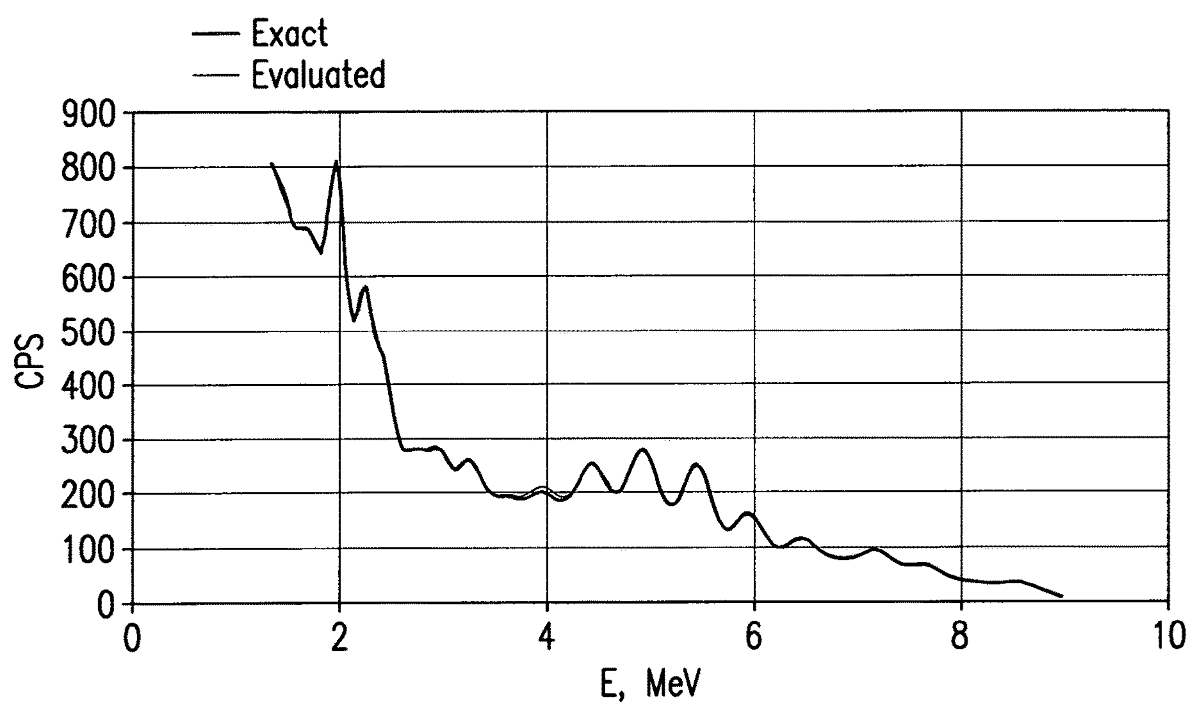
FIG. 4 is a table of weight fractions and formation parameters as employed in an illustrative example of the present disclosure.
FIG. 5 is a test capture spectrum corresponding to an example formation of the illustrative example.

The weight fractions and other formation parameters are shown in FIG. 4. In this example, a hydrogen weight fraction $WF_H$ is 0.0086, a calcium weight fraction $WF_{Ca}$ is 0.3231, a magnesium weight fraction $WF_{Mg}$ is 0.0923, and a sulfur weight fraction $WF_S$ is 0.3231. A density of the formation is 2.6 g/cc and a sigma of the formation is 0.0186 l/cm. A test capture spectrum corresponding to the example formation is presented in FIG. 5. In this example, the test capture spectrum is decomposed and the weight concentrations from FIG. 4 are evaluated.

The test spectrum is decomposed on standard spectra. The decomposition provides the yields $Y_j$ of the capture photons from the chemical constituents of the formation. Tool sensitivity factors $K_j$ and $B_j$ are known in advance, such as designated by a manufacturer, tested in a laboratory, etc. Taking molar masses from the periodic table and microscopic cross sections from nuclear constant libraries (e.g., known sources), all parameters needed for the evaluation of the element weight concentrations are obtained, as shown in FIG. 6.

Applying Equation (4), described above, to the evaluated yields, the thermal neutron capture probabilities are obtained, as shown in FIG. 7. As shown in the first row of thermal neutron capture probabilities of FIG. 7, the sum of the evaluated probabilities was not equal to unity (last column). Accordingly, normalized thermal neutron capture probabilities were calculated, as shown in the second row of values of FIG. 7 (with a unity sum shown in the last column). The normalized thermal neutron capture probabilities can then be used to obtain the weight concentration.

For example, applying Equation (7), the weight concentrations are obtained and are shown in FIG. 8. As shown in FIG. 8, relative errors of evaluation are also given. In this example test, the errors do not exceed 3% except the magnesium concentration. The relatively large error of the magnesium weight concentration is present due to the low value of the magnesium yield. In this example, the magnesium yield did not exceed a residual between measured and restored spectra.

As noted above, embodiments provided herein are directed to evaluations of concentrations of formation elements/composition. In contrast to prior processes, embodiments of the present disclosure eliminate the oxide closure model from consideration. Further, embodiments provided herein eliminate use of the formation factor F that has an empirical basis and may provide uncontrolled errors in evaluated parameters. In the approach described herein, a formation cross-section of neutron absorption derived from neutron decay time measurements are employed (e.g., neutron source and detection by detector). The neutron-induced detection signals are used in a two-step process. As discussed above, a transformation of the elemental yields (measured data) into thermal neutron capture probabilities of neutron absorptions is performed. Corrections for instability of neutron generator output and neutron absorptions at high energies (>1 MeV) can be performed as well. Subsequently, the thermal neutron capture probabilities can be used to obtain actual weight fractions of evaluated elements.

Embodiment 1: A method for measuring formation properties in downhole operations, the method comprising: generating, at a neutron source, neutrons that are emitted into a downhole formation; registering, at a detector, photons generated by chemical constituents of the downhole formation; measuring a response of the photons registered at the detector; transforming, with a computing system, the measured responses of the photons registered at the detector into thermal neutron capture probabilities; and transforming the thermal neutron capture probabilities into weight concentrations of the chemical constituents of the downhole formation.

Embodiment 2: The method of any embodiment herein, wherein the neutron source is a pulsed neutron source.

Embodiment 3: The method of any embodiment herein, further comprising normalizing the thermal neutron capture probabilities to unity prior to obtaining the weight concentrations.

Embodiment 4: The method of any embodiment herein, wherein the computing system comprises a surface computing element and a downhole computing element.

Embodiment 5: The method of any embodiment herein, further comprising performing a drilling operation using bottomhole assembly, wherein the neutron source, the detector, and at least a part of the computing system are part of the bottomhole assembly.

Embodiment 6: The method of any embodiment herein, wherein measuring the response of the photons comprises measuring capture photon energy spectra and measuring thermal neutron decay time.

Embodiment 7: The method of any embodiment herein, wherein the thermal neutron capture probabilities are linear functions of elemental yields.

Embodiment 8: The method of any embodiment herein, wherein the thermal neutron capture probabilities are calculated as $$P_j = \frac{\rho Y_j - B_j}{K_j},$$

$j=1, N$, wherein Yj is the yield of the j-th element, ρ is formation density, and Kj and Bj are tool sensitivity factors.

Embodiment 9: The method of any embodiment herein, wherein transforming the thermal neutron capture probabilities into weight concentrations comprises representing the thermal neutron capture probabilities as functions of cross-sections.

Embodiment 10: The method of any embodiment herein, further comprising at least one of measuring a thermal neutron decay time, wherein the weight concentration is calculated as $$W_j = \frac{\Sigma \cdot P_j \cdot M_j}{N_A \cdot \rho \cdot \sigma_j},$$

$j=1, N$, wherein Wj is the weight concentration of the j-th element, Σ is a formation macroscopic cross section of thermal neutron absorption, Pj is the thermal neutron capture probability, Mj is the molar mass, $N_A$ is the Avogadro constant, ρ is formation density, and $\sigma_j$ is a microscopic cross section of thermal neutron absorption.

Embodiment 11: A system for measuring formation properties in downhole operations, the system comprising: a neutron source configured to emit neutrons into a downhole formation; a detector configured to register photons that are generated by chemical constituents of the downhole formation; and a computing system configured to: measure a response of the photons detected by the detector; transform the measured response of the photons into thermal neutron capture probabilities; and transform the thermal neutron capture probabilities into weight concentrations of the chemical constituents of the downhole formation.

Embodiment 12: The system of any embodiment herein, wherein the neutron source is a pulsed neutron source.

Embodiment 13: The system of any embodiment herein, the computing system further configured to normalize the thermal neutron capture probabilities to unity prior to obtaining the weight concentrations.

Embodiment 14: The system of any embodiment herein, wherein the computing system comprises a surface computing element and a downhole computing element.

Embodiment 15: The system of any embodiment herein, further comprising a bottomhole assembly for performing drilling operations, wherein the neutron source, the detector, and at least a part of the computing system are part of the bottomhole assembly.

Embodiment 16: The system of any embodiment herein, wherein measuring the response of the photons comprises measuring capture photon energy spectra and measuring thermal neutron decay time.

Embodiment 17: The system of any embodiment herein, wherein the thermal neutron capture probabilities are linear functions of elemental yields.

Embodiment 18: The system of any embodiment herein, wherein the thermal neutron capture probabilities are calculated as $$P_j = \frac{\rho Y_j - B_j}{K_j},$$

$j=1, N$, wherein Yj is the yield of the j-th element, ρ is formation density, and Kj and Bj are tool sensitivity factors.

Embodiment 19: The system of any embodiment herein, wherein transforming the thermal neutron capture probabilities into weight concentrations comprises representing the capture probabilities as functions of cross-sections.

Embodiment 20: The system of any embodiment herein, the computing system further configured to measure a thermal neutron decay time, wherein the weight concentration is calculated as $$W_j = \frac{\Sigma \cdot P_j \cdot M_j}{N_A \cdot \rho \cdot \sigma_j},$$

$j=1, N$, wherein $W_j$ is the weight concentration of the j-th element, Σ is a formation macroscopic cross section of thermal neutron absorption, $P_j$ is the thermal neutron capture probability, $M_j$ is the molar mass, $N_A$ is the Avogadro constant, ρ is formation density, and $\sigma_j$ is a microscopic cross section of thermal neutron absorption.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively, or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The flow diagram(s) depicted herein is just an example. There may be many variations to this diagram or the steps (or operations) described therein without departing from the scope of the present disclosure. For instance, the steps may be performed in a differing order, or steps may be added, deleted or modified. All of these variations are considered a part of the present disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

The invention claimed is:

1. A method for measuring formation properties in downhole operations, the method comprising:
- generating, at a neutron source, neutrons that are emitted into a downhole formation;
- registering, at a detector, photons generated by chemical constituents of the downhole formation;
- measuring a response of the photons registered at the detector, wherein measuring the response of the photons comprises both (i) measuring capture photon energy spectra and (ii) measuring thermal neutron decay time;
- transforming, with a computing system, the measured responses of the photons registered at the detector into thermal neutron capture probabilities; and
- transforming the thermal neutron capture probabilities into weight concentrations of the chemical constituents of the downhole formation.

2. The method of claim 1, wherein the neutron source is a pulsed neutron source.

3. The method of claim 1, further comprising normalizing the thermal neutron capture probabilities to unity prior to obtaining the weight concentrations.

4. The method of claim 1, wherein the computing system comprises a surface computing element and a downhole computing element.

5. The method of claim 1, further comprising performing a drilling operation using bottomhole assembly, wherein the neutron source, the detector, and at least a part of the computing system are part of the bottomhole assembly.

6. The method of claim 1, wherein the thermal neutron capture probabilities are linear functions of elemental yields.

7. The method of claim 6, wherein the thermal neutron capture probabilities are calculated as $$P_j = \frac{\rho Y_j - B_j}{K_j},$$

j=1, N, wherein $Y_j$ is the yield of the j-th element, ρ is formation density, and $K_j$ and $B_j$ are tool sensitivity factors.

8. The method of claim 1, wherein transforming the thermal neutron capture probabilities into weight concentrations comprises representing the thermal neutron capture probabilities as functions of cross-sections.

9. The method of claim 1, further comprising at least one of measuring a thermal neutron decay time, wherein the weight concentration is calculated as $$W_j = \frac{\Sigma \cdot P_j \cdot M_j}{N_A \cdot \rho \cdot \sigma_j},$$

j=1, N, wherein Wj is the weight concentration of the j-th element, Σ is a formation macroscopic cross section of thermal neutron absorption, $P_j$ is the thermal neutron capture probability, $M_j$ is the molar mass, $N_A$ is the Avogadro constant, ρ is formation density, and $\sigma_j$ is a microscopic cross section of thermal neutron absorption.

10. A system for measuring formation properties in downhole operations, the system comprising:
- a neutron source configured to emit neutrons into a downhole formation;
- a detector configured to register photons that are generated by chemical constituents of the downhole formation; and
- a computing system configured to:
- measure a response of the photons detected by the detector;
- transform the measured response of the photons into thermal neutron capture probabilities;
- normalize the thermal neutron capture probabilities to unity prior to obtaining the weight concentrations; and
- transform the thermal neutron capture probabilities into weight concentrations of the chemical constituents of the downhole formation.

11. The system of claim 10, wherein the neutron source is a pulsed neutron source.

12. The system of claim 10, wherein the computing system comprises a surface computing element and a downhole computing element.

13. The system of claim 10, further comprising a bottomhole assembly for performing drilling operations, wherein the neutron source, the detector, and at least a part of the computing system are part of the bottomhole assembly.

14. The system of claim 10, wherein measuring the response of the photons comprises measuring capture photon energy spectra and measuring thermal neutron decay time.

15. The system of claim 10, wherein the thermal neutron capture probabilities are linear functions of elemental yields.

16. The system of claim 15, wherein the thermal neutron capture probabilities are calculated as $$P_j = \frac{\rho Y_j - B_j}{K_j},$$

j=1, N, wherein $Y_j$ is the yield of the j-th element, ρ is formation density, and $K_j$ and $B_j$ are tool sensitivity factors.

17. The system of claim 10, wherein transforming the thermal neutron capture probabilities into weight concentrations comprises representing the capture probabilities as functions of cross-sections.

18. The system of claim 10, the computing system further configured to measure a thermal neutron decay time, wherein the weight concentration is calculated as $$W_j = \frac{\Sigma \cdot P_j \cdot M_j}{N_A \cdot \rho \cdot \sigma_j},$$

j=1, N, wherein $W_j$ is the weight concentration of the j-th element, Σ is a formation macroscopic cross section of thermal neutron absorption, $P_j$ is the thermal neutron capture probability, $M_j$ is the molar mass, $N_A$ is the Avogadro constant, ρ is formation density, and $\sigma_j$ is a microscopic cross section of thermal neutron absorption.

19. A method for measuring formation properties in downhole operations, the method comprising:

generating, at a neutron source, neutrons that are emitted into a downhole formation;

registering, at a detector, photons generated by chemical constituents of the downhole formation;

measuring a response of the photons registered at the detector;

transforming, with a computing system, the measured responses of the photons registered at the detector into thermal neutron capture probabilities, wherein the thermal neutron capture probabilities are linear functions of elemental yields; and transforming the thermal neutron capture probabilities into weight concentrations of the chemical constituents of the downhole formation.

* * * * *